United States Patent [19]

Fujioka et al.

[11] Patent Number: 5,292,849

[45] Date of Patent: Mar. 8, 1994

[54] PROCESS FOR THE MANUFACTURING OF ACRYLIC ORGANOPOLYSILOXANES

[75] Inventors: Kazutoshi Fujioka; Takafumi Sakamoto; Masatoshi Arai, all of Annaka, Japan

[73] Assignee: Shin-Etsu Chemical Co., Ltd., Tokyo, Japan

[21] Appl. No.: 997,485

[22] Filed: Dec. 28, 1992

[30] Foreign Application Priority Data

Dec. 27, 1991 [JP] Japan .................... 3-359422

[51] Int. Cl.$^5$ .......................................... C08G 77/06
[52] U.S. Cl. .................................. 528/18; 528/34; 526/279
[58] Field of Search .................... 528/18, 34; 526/279

[56] References Cited

U.S. PATENT DOCUMENTS

| | | | |
|---|---|---|---|
| 4,528,081 | 7/1985 | Lien et al. ........................ | 528/34 |
| 4,675,346 | 6/1987 | Lin et al. ......................... | 522/39 |
| 4,818,891 | 4/1989 | Drinkwater ...................... | 307/66 |

*Primary Examiner*—Melvyn I. Marquis
*Attorney, Agent, or Firm*—Millen, White, Zelano, & Branigan

[57] ABSTRACT

This invention enables the selective and easy manufacturing of acrylic organopolysiloxanes which are cured by the irradiation of UV light, by the reaction of the hydroxyl group containing organosilicon compounds (A) of formula (1):

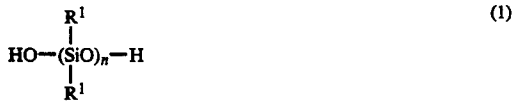

wherein each $R^1$ independently is a substituted or an unsubstituted monovalent hydrocarbon group, and n designates integers from 1 to 10,000 with the acrylic group containing silane compounds (B) of formula (2):

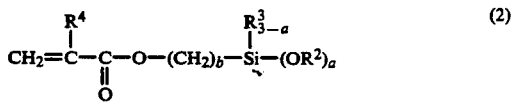

wherein each $R^2$ and $R^3$ independently is a substituted or an unsubstituted monovalent hydrocarbon group, $R^4$ is either a hydrogen atom or a methyl group, and each of a and b is an integer from 1 to 3, in the presence of a divalent tin compound of formula (3):

$$SnX_2$$

wherein each X independently is a halogen atom, alkoxy group, or a residue of a carboxyl group, in order to produce the acrylic organopolysiloxanes of formula (4):

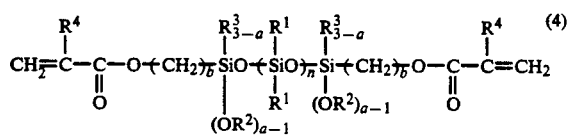

wherein $R^1$ through $R^4$, n, a and b are described as above.

8 Claims, No Drawings

PROCESS FOR THE MANUFACTURING OF ACRYLIC ORGANOPOLYSILOXANES

SUMMARY OF THE INVENTION

This invention relates to a process for manufacturing acrylic organopolysiloxanes which are useful as a major raw material in UV light curing type silicone rubber compositions. The invention also relates to obtained acrylic organopolysiloxanes by the said methods.

It is well known that organopolysiloxanes are cured by heating in the presence of organic peroxides to form silicone rubber elastic bodies which have superior heat resistance, cold resistance, weather resistance, and electrical characteristics. In addition, some organopolysiloxanes are known to be cured by irradiation of light in the presence of photochemical reaction initiators. For example, an acrylic organopolysiloxane which possesses acrylic groups was proposed as this type (Japanese Patent Application KOKOKU (Examined) 53-365165 corresponding to GB 1323869 and U.S. Pat. No. 4,675,346). However, such an organopolysiloxane must be a linear polymer with a high molecular weight in order to obtain a rubber-like elastic body from the corresponding acrylic organopolysiloxane. In this case, the amount of acrylic groups which locate at the end of the molecular chain is relatively small, leading to the organopolysiloxane having low curing ability. In addition, surface portions of the polymer in contact with air are not well cured due to the curing inhibition effect of oxygen. Therefore, only resin type acrylic organopolysiloxanes which contain a relatively large amount of acrylic groups have so far been practically employed among this group of compounds. However, the usage of these resins has not yet resulted in rubber-like elastic bodies of a satisfactory quality.

An acrylic organopolysiloxane which provides a practical silicone rubber elastic body was proposed in Japanese Patent Application KOKAI (Laid Open) 63-183911 corresponding to U.S. Patent Application Ser. No. 07/645,801 (filed Jan. 25, 1991) and European Patent Application No. 276986. This compound was obtained by introducing a multiple number of alkyl groups at the end of a linear molecular chain of the organopolysiloxane using acryloxyalkyl silanol. However, its manufacturing process involves many steps, which make its practical industrialization extremely difficult.

Therefore, one purpose of this invention is to offer an extremely simple and low cost method to prepare acrylic organopolysiloxanes which provide practical and useful silicone rubber elastic bodies, curable upon irradiation by light.

This invention enables the selective and easy manufacturing of acrylic organopolysiloxanes which are cured by the irradiation of a UV light, leading to economical advantages. The obtained acrylic organopolysiloxanes are extremely useful as a basic raw material for the production of elastic bodies which present excellent adhesiveness towards glass, metals, plastics, and so on. Among these acrylic organopolysiloxanes, those with alkoxyl groups are useful as refining agents and surface treatment agents for inorganic and organic materials and also as basic raw materials for silicone resins and rubbers which are cured through alcohol elimination.

This invention offers a manufacturing method for acrylic organopolysiloxanes which are characterized by the reaction of a hydroxyl group containing organosilicon compound (A) expressed by general chemical formula (1):

wherein $R^1$ is a substituted or an unsubstituted monovalent hydrocarbon group, each of which can be the same or different, and n designates integers from 1 to 10,000, with an acrylic group-containing silane compound (B) expressed by general chemical formula (2):

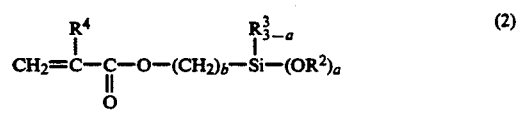

wherein each of $R^2$ and $R^3$ is a substituted or an unsubstituted monovalent hydrocarbon group, which can be the same or different, $R^4$ is either a hydrogen atom or a methyl group, and each of a and b is an integer from 1 to 3, in the presence of a divalent tin compound expressed by the general chemical formula (3):

$$SnX_2 \qquad (3)$$

wherein X is a halogen atom, an alkoxy group, or the residue of a carboxyl group and each X can be the same or different, in order to prepare the said acrylic organopolysiloxanes, having the general chemical formula (4):

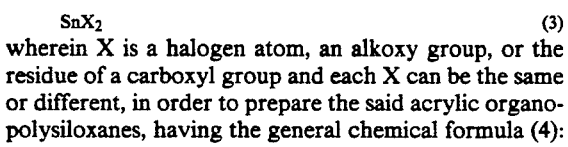

wherein $R^1$ through $R^4$, n, a and b are the same as described above.

In other words, one feature of this invention is the use of the divalent tin compounds as condensing $ catalysts. Employment of these compounds enables the selective reaction between the silanol group in the organosilicon compound (A) and the alkoxysilyl group in the acrylic group containing silane compound (B) to react by eliminating alcohol. As a result, the intended product, acrylic organopolysiloxane, is obtained easily and quantitatively. By contrast, the use of commonly known condensing catalysts other than divalent tin compounds, such as tetravalent tin compounds, titanium compounds, and various types of amine compounds, results in the condensation between silanols, and therefore very little acrylic organopolysiloxane is obtained.

(A) Hydroxyl group containing organosilicon compounds

The organosilicon compounds (A), utilized as a starting raw material in this invention, are expressed by the general formula (1). In this general formula (1), examples of $R^1$ are alkyl groups such as a methyl group, ethyl group, propyl group, butyl group, hexyl group, and octyl group as well as pentyl, heptyl, nonyl and decyl groups; alkenyl groups such as a vinyl group, allyl group, butenyl group, and hexenyl group as well as propenyl, pentenyl, heptenyl, octenyl, nonenyl and decenyl groups; cycloalkyl groups such as a cyclohexyl group as well as cyclopropyl, cyclobutyl, cyclopentyl, cycloheptyl, cyclooctyl, cyclononyl, and cyclodecyl groups; aryl groups such as a phenyl group and a tolyl group; aralkyl groups such as a benzyl group and a 2-phenyl ethyl group; and the above groups in which a part of, or all of, the hydrogen atoms are substituted with halogen atoms or cyano groups, such as a chloromethyl group and a 3,3,3-trifluoropropyl group. Among these groups, those which possess from 1 to 10 numbers of carbon atoms, especially from 1 to 8 carbon atoms, are more desirable. Where hydrogen atoms are replaced by halogen atoms or cyano groups, preferably 1–3 hydrogen atoms are replaced.

It is also important that n is an integer in the range from 1 to 10,000 in the general equation (1). For example, when an organopolysiloxane of which the n value is larger than is employed, the content of acrylic groups in the resultant acrylic organopolysiloxane becomes small, which leads to insufficient curing.

In this invention, non-limiting examples of such an organosilicon compound are listed below as compounds 1 through 7. In the examples below, Me, Ph, and Vi designate a methyl group, phenyl group, and vinyl group, respectively.

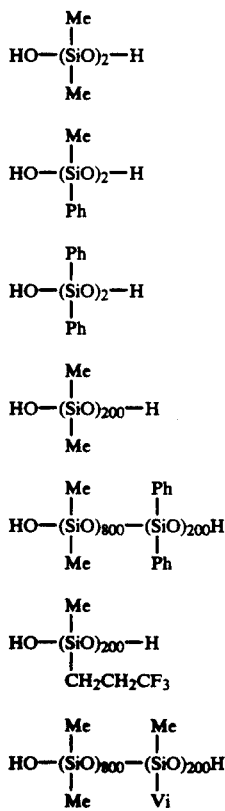

(B) Acrylic group containing silane compounds

The acrylic group-containing silane compounds (B), reacted with the said organosilicon compounds (A) in the invention, are expressed by the previous general formula (2). In this formula, examples of groups for $R^2$ and $R^3$ are similar to those listed for the said $R^1$, however, preferable groups, especially for $R^2$, are alkyl groups or alkoxy substituted alkyl groups with from 1 to 10 carbon atoms. The most preferable is a methyl group. $R^4$ is either a hydrogen atom or a methyl group.

The letter a designates an integer from 1 to 3. If a were zero (a=0), there would be no alkoxyl group in the molecule, and accordingly no reactivity toward organosilicon compound (A).

The variable b is also an integer from 1 to 3.

In this invention, non-limiting examples for the acrylic group containing silane compounds are listed below as compounds 1 to 4.

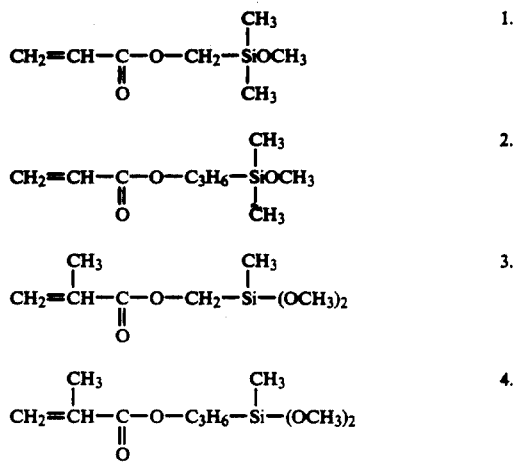

(C) Tin compounds

Divalent tin compounds in this invention function as a condensing catalyst as described above and are expressed by general formula. (3). In general formula (3), examples of X as halogen atoms are: chlorine, bromine and iodine, examples as alkoxyl groups are: methoxy, ethoxy, propoxy and butoxy, which possess from 1 to 20 carbon atoms, and examples as the residue of a carboxyl group are those residues of carboxyl groups which possess from 1 to 20 carbon atoms such as an acetyl group and an octanoyl group. The alkoxy and carboxyl groups may possess double bonds between carbon atoms. Non-limiting examples of such divalent tin compounds are listed below as compounds 1 through 8:

1. $SnCl_2$
2. $SnBr_2$
3. $SnI_2$
4. $Sn(OOCCH_3)_2$
5. $Sn(OOCC_7H_{15})_2$
7. $Sn(OMe)_2$
8. $Sn(OOCC_{15}H_{31})_2$

Divalent tin compound based catalysts are commercially available. For example, the tin dioctanoate "DABCO®T-9 CATALYST" is available from Air Products & Chemicals, Inc.

In this invention, the organosilicon compound (A) is reacted with the acrylic group-containing silane compound (B) in the presence of the tin compound (C). During the reaction, an excess amount of the acrylic group-containing silane compound (B) is desirably used, with respect to the organosilicon compound (A). For example, the molar ratio of compound (B) used is from 0 to 9.0 per mole of the hydroxyl group in compound (A). The amount of the tin compound (C) used is 10 to 10,000 ppm with respect to the amount of the organosilicon compound (A). In this case, the acrylic group containing silane compound (B) is preferably mixed in after the thorough mixing of the organosilicon compound (A) and the tin compound (C), then the final mixture is brought to reaction under the reaction conditions. The reaction is usually initiated by heating the mixture at 20° to 120° C. The usual duration for the reaction is from several hours to 48 hours, depending upon the reaction temperature. The reaction above can be carried out without using any solvents, however, it is also possible to use organic solvents such as toluene, benzene, and xylene as a reaction solvent, as long as they do not influence the reaction in a negative manner.

The reaction described above provides the ultimate product, the acrylic organopolysiloxane, expressed by the general formula (4). During the reaction, alcohol is generated as a by-product, which can be easily eliminated by typical distillation methods. This alcohol can remain in the product if the future application allows.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The entire disclosure of all applications, patents and publications, cited above and below, and of corresponding Japanese No. 3-359422 are hereby incorporated by reference.

In the examples of this invention, all the viscosity values were measured at 25° C.

EXAMPLES

Example 1

A one liter round-bottom four-neck flask is installed with a thermometer, a condenser, a dropping funnel, and a stirring instrument. A 750 g quantity of dimethyl polysiloxane with terminal hydroxyl groups (0.5 mol of OH group/100g with 50 cs viscosity), which is expressed by the equation below, is introduced to the flask:

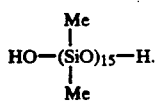

Then, 0.75 g of tin dioctanoate (about 10,000 ppm with respect to the quantity of dimethyl polysiloxane) with terminal hydroxyl groups is further mixed in. A 350 g quantity of acryloxymethyl methyldimethoxysilane is added to this mixture drop by drop and the reaction is carried out at 60° C. for three hours. After the reaction is completed, the by-product, methanol, is stripped at 70° C. and 5 mmHg. The colorless and transparent final product (viscosity 70 cs), expressed by the formula below is obtained with 95% yield:

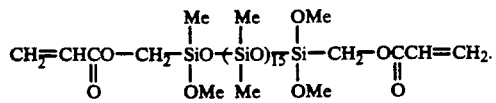

The structure of the reaction product is confirmed by IR spectroscopy.

A 2 g quantity of diethoxy acetophenone and a 0.5 g of dibutyl tin dioctanoate are further mixed into 100 g of the obtained product. The UV light irradiation of this mixture results in a cured product, a rubber-like elastic body. When this mixture is left at 20° C. and 55% relative humidity (RH) for three days, it cures similarly to provide a rubber-like elastic body.

Example 2

A 500 g quantity of dimethyl polysiloxane with terminal hydroxyl groups (viscosity: 1500 cs, degree of polymerization: 220, and OH group content: 0.009 mol/100 g) and 0.20 g of tin dioctanoate (400 ppm with respect to said polysiloxane) are mixed within a flask similar to that used in Example 1. Then a 23.4 g quantity of acryloxypropyl trimethoxysilane is added to this mixture drop by drop and the reaction is carried out at 70° C. for three hours. After the reaction is completed, the by-product, methanol, is stripped under the conditions of 70° C. and 5 mmHg. The colorless and transparent final product (viscosity 1600 cs) is obtained with 95% yield. This product is analyzed using NMR spectroscopy, IR spectroscopy, and gas mass spectroscopy and identified as the product expressed by the formula below:

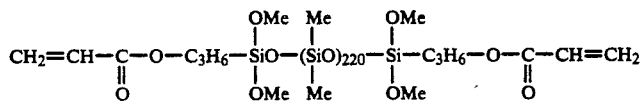

A 2 g quantity of diethoxy acetophenone and a 0.5 g of dibutyl tin dioctanoate are further mixed into 100 g of the obtained product. UV light irradiation of this mixture results in a cured product, a rubber-like elastic body. When this mixture is left at 20° C. and 55% RH for three days, in place of the UV light irradiation, it cures similarly to provide a rubber-like elastic body.

Comparison Example 1

Reaction as in Example 2 is performed, except employing 0.5 g of dibutyl tin dioctanoate, in place of the tin dioctanoate in the Example 2. The obtained product is similarly tested for its curing property under UV light irradiation, however, no curing is observed.

Example 3

A 500 g quantity of dimethyl polysiloxane with terminal hydroxyl groups used in the Example 2 and 0.20 g of tin dioctanoate (400 ppm with respect to the polysiloxane) are similarly mixed as in Example 2. A 23.4 g quantity of methacryloxypropyl trimethoxysilane is added to this mixture drop by drop and the reaction is carried out at 70° C. for three hours. After the reaction is completed, the by-product, methanol, is stripped at 70° C. and 5 mmHg. The colorless and transparent final product (viscosity 1800 cs) is obtained with 95% yield. This product is analyzed using NMR spectroscopy, IR spectroscopy, and gas mass spectroscopy and identified as the product expressed by the formula below:

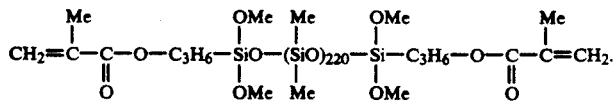

The obtained product is also tested for its curing properties under UV light irradiation and room temperature curing, which are as similarly described in Example 2. Both tests resulted in the rubber-like elastic body, the cured product.

Comparison Example 2

The similar reaction as in Example 3 is performed, except employing 5.0 g of tetra-iospropyl titanate, in place of the tin dioctanoate in Example. The obtained product was similarly tested for its curing property under UV light irradiation, however, no curing is observed.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for the production of an acrylic organopolysiloxane, comprising reacting a hydroxyl group containing organosilicon compound (A) of formula (1):

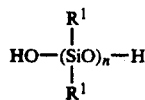

wherein each $R^1$ independently is a substituted or an unsubstituted monovalent hydrocarbon group, and n is an integer from 1 to 10,000, with an acrylic group-containing silane compound (B) of formula (2):

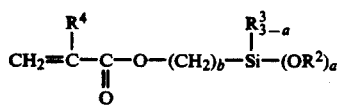

wherein each of $R^2$ and $R^3$ independently is a substituted or an unsubstituted monovalent hydrocarbon group, $R^4$ is a hydrogen atom or a methyl group, and each of a and b independently is an integer from 1 to 3, in the presence of a divalent tin compound of formula (3):

wherein each X independently is a halogen atom, an alkoxy group, or the residue of carboxylic acid, to produce an acrylic organopolysiloxane of formula (4):

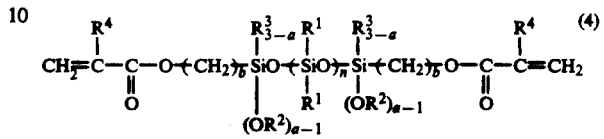

wherein $R^1$ through $R^4$, n, a and b are as described above.

2. A process according to claim 1, wherein $R^1$, $R^2$ and $R^3$ are each independently alkyl, alkenyl, cycloalkyl, aryl, aralkyl of 1–10 carbon atoms, each optionally substituted by halogen or cyano.

3. A process according to claim 1, wherein $R^1$ is methyl, ethyl, propyl, butyl, hexyl, octyl, vinyl, allyl, butenyl, hexenyl, cyclohexyl, phenyl, tolyl, benzyl, 2-phenyl ethyl, chloromethyl or 3,3,3-trifluoropropyl.

4. A process according to claim 1, wherein $R^2$ is $C_{1-10}$-alkyl or alkoxy-substituted alkyl with 1 to 10 carbon atoms.

5. A process according to claim 3, wherein $R^2$ is $C_{1-10}$-alkyl or alkoxy-substituted alkyl with 1 to 10 carbon atoms.

6. A process according to claim 1, wherein organosilicon compound (A) is:

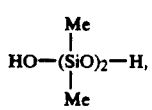 (a)

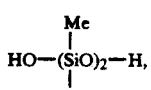 (b)

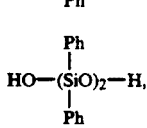 (c)

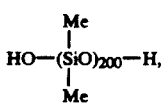 (d)

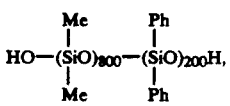 (e)

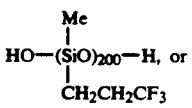 (f)

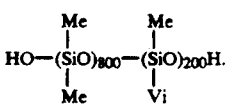 (g)

7. A process according to claim 1, wherein silane compound (B) is (a) 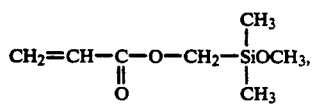
(b) 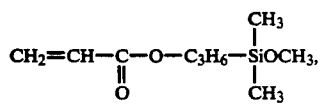
(c) 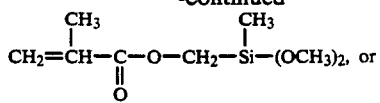
(d) 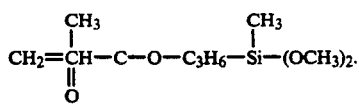
8. A process according to claim 1, wherein the divalent tim compound is $SnCl_2$, $SnBr_2$, $SnI_2$, $Sn(OOCCH_3)_2$, $SnC_2O_4$, $Sn(OOCC_7H_{15})_2$, $Sn(OMe)_2$ or $Sn(OOCC_{15}H_{31})_2$.